Figure 1:
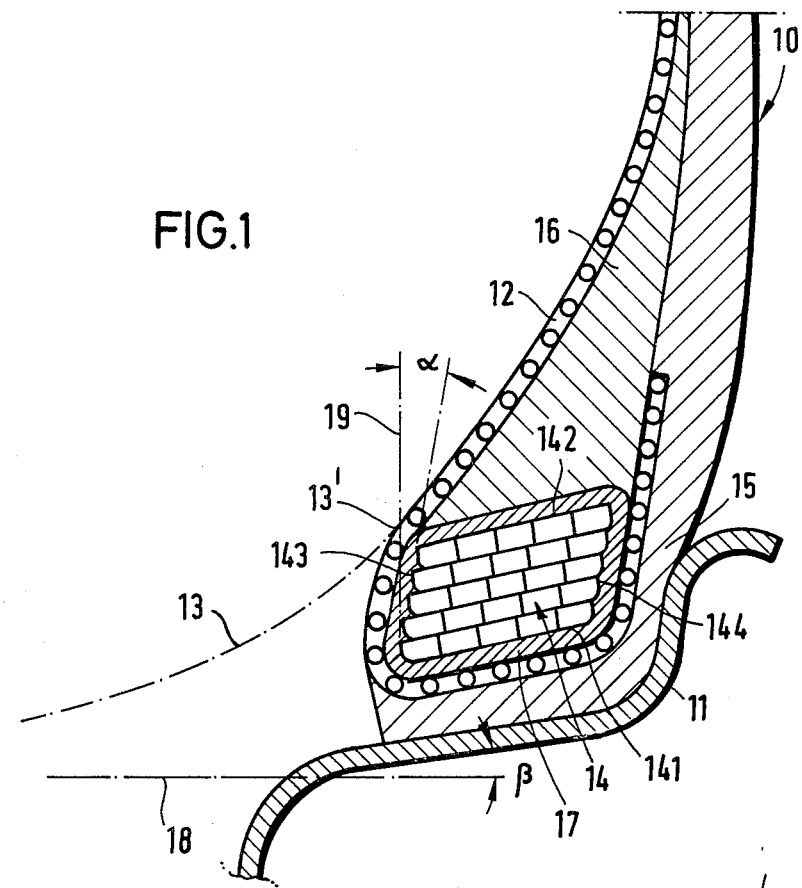

United States Patent [19]

Merten

[11] 4,406,317

[45] Sep. 27, 1983

[54] PNEUMATIC TIRE OF VEHICLE, WIRE CORE FOR USE THEREIN AND APPARATUS FOR PRODUCING SAID WIRE CORE

[75] Inventor: Hans Merten, Königswinter, Fed. Rep. of Germany

[73] Assignee: Otto Kuhlmann GmbH & Co., Hemer-Westig, Fed. Rep. of Germany

[21] Appl. No.: 327,108

[22] Filed: Dec. 3, 1981

[30] Foreign Application Priority Data

Dec. 18, 1980 [DE] Fed. Rep. of Germany ....... 3047669
Dec. 18, 1980 [DE] Fed. Rep. of Germany ....... 3047783

[51] Int. Cl.³ ............................................. B60C 15/04
[52] U.S. Cl. .............................. 152/362 R; 156/136; 245/1.5
[58] Field of Search .......................... 152/362 R, 391; 156/136, 422; 245/1.5; 57/902

[56] References Cited

U.S. PATENT DOCUMENTS

| 3,949,800 | 4/1976 | Lejeune | 152/362 R |
| 4,085,787 | 4/1978 | Maiocchi | 152/362 R |
| 4,166,492 | 9/1979 | Pfeiffer | 152/362 R |
| 4,180,116 | 12/1979 | Maiocchi | 152/362 R |
| 4,216,814 | 8/1980 | Grosch et al. | 152/362 R |
| 4,305,769 | 12/1981 | Asguier et al. | 156/136 |

FOREIGN PATENT DOCUMENTS

| 2254584 | 5/1973 | Fed. Rep. of Germany ... 152/362 R |
| 1327810 | 4/1962 | France ........................... 152/362 R |

Primary Examiner—Edward C. Kimlin
Assistant Examiner—F. K. Wine
Attorney, Agent, or Firm—Spensley, Horn, Jubas & Lubitz

[57] ABSTRACT

A wire core for a pneumatic tire in which at least one edge of the wire core is rounded relative to the internal edges of the wire core to minimize wear of the carcass enclosing the wire core.

4 Claims, 5 Drawing Figures

U.S. Patent  Sep. 27, 1983  Sheet 1 of 2  4,406,317

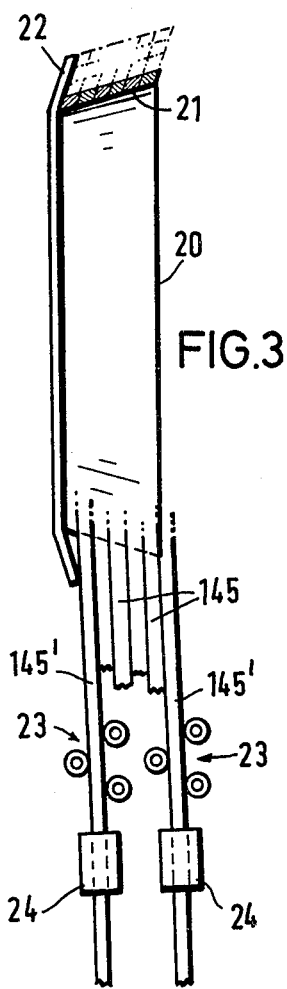
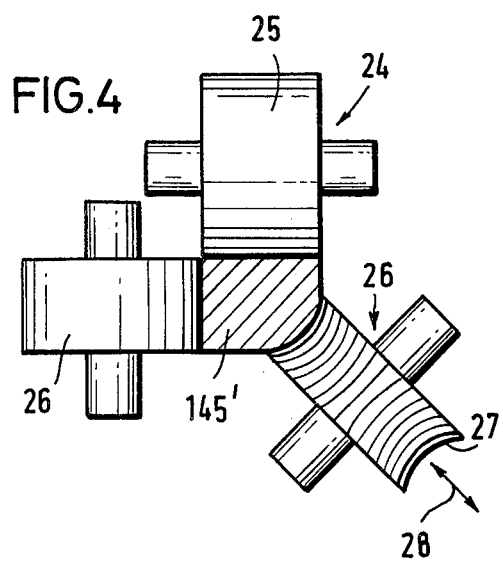
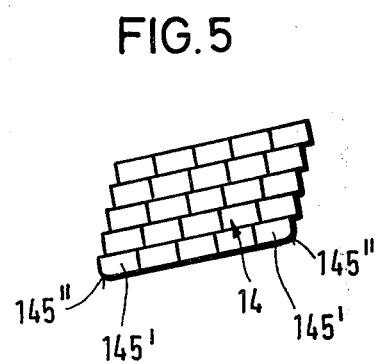

PNEUMATIC TIRE OF VEHICLE, WIRE CORE FOR USE THEREIN AND APPARATUS FOR PRODUCING SAID WIRE CORE

The invention relates to a pneumatic tire of a vehicle with tire beads montable in a rim, said tire comprising a wire core enclosed at least partly by a carcass and made of wire layers wound to be placed over one another and consisting of wires having an angular cross section.

High duty vehicle tires suffer from considerable stress concentrations within the region of the tire foot, which are due, on the one hand, to the fact that the tire in the region assuming load support on the roadway, i.e. in the foot region, bulges out laterally beyond the rim edge, said bulging taking place periodically during the travel in accordance with the speed of the wheel. The tire beads mounted in the rim of known pneumatic vehicle tires are provided with a corresponding core of wires wound in parallel. The reinforcing inlay or carcass contained in the tire is wound about the wire cores to end in the outer jacket of the tire above the rim edge.

In the cross section of the tire, the carcass is more or less shaped like an ellipsoid open at the bottom and whose ends about the wire cores are bent outwardly.

During the periodic stress of the tire in movement, deformations come to pass in the region of the turning points of the deflected carcass ends, thus affecting the quality of the tire. To avoid points of break of the carcass at the edges of the wire core, it has been customary to mold hard rubber compositions about the wire cores and to influence favorably by the form of the rubber mixture the occurring change of the carcass. To save cost, it is preferred to wrap the wire cores only with protective strips incorporated in the tire instead of molding them in a hard rubber composition.

In addition, there have been known wire cores having a round or oval cross section, as a whole, or wire cores having bulged out lateral walls. While the load peaks are reduced with such wire cores, it is difficult to produce such wire cores having lateral walls bulged outwardly.

To adapt the tire core to frustoconical rims, it has been known to produce wire cores having a parallelogram-shaped cross section (U.S. Pat. No. 3,949,800). To this effect—seen in cross section—the lateral walls of the wire core are vertical, i.e. they extend in parallel to a plane extending perpendicularly to the axis of the wire core while the (annular) interior surface and outer surface of the wire core are conical.

It is the object of the invention to provide a pneumatic tire of a vehicle the wire core of which can be produced in a relatively simple manner by means of a winding process and which, in spite of the use of a rectangular cross section of the wire material will cause, relatively low load peaks at the material surrounding it with its edges.

It is another object of the invention to provide a pneumatic tire of a vehicle which is particularly suitable for high-duty service and in which the load peaks occurring within the tire material in the foot region of the tire are reduced.

According to the invention it is provided that at least one of the outer wires of the lowermost and/or uppermost wire layer has a smoothed off or chamfered edge.

Thus, at least one of the edge wires of the wire core of the invention is provided with a flat or round portion and, as a result, the wire core, being rectangular in total, comprises one edge at least for all that which is smoothed off. By this means the stress concentration caused by the corresponding edge of the wire core is reduced in the surrounding material and at the carcass placed partly about the wire core.

It is possible to construct the wire core in such a way that only those wire turns of a wire forming the outer lateral limitation of the wire core, are smoothed or flat which are resting at one edge of the wire core. In other words, in case of several wires wound in parallel side by side, only the corresponding outer wires need be worked in parts of their lengths to produce the flat or round effect in a region which, after the winding, will form one edge of the wire core. Due to such a sectionwise working of the wires, the control of the processing device has to be relatively complicated subject to the coil thickness of the wire already wound up. It is possible to use a simpler method by producing the wire core with the use of edge wires comprising already over their total length a smoothed or flat edge. If so, all turns of the wires forming the lateral limitations of the wire core contain a round or flat edge—i.e. also the wire turns which are not situated at an edge of the wire core.

The invention additional contemplates a wire core to be used in the disclosed pneumatic tire of a vehicle and an apparatus for the production of such a wire core. Said apparatus comprising a winding drum on which several wires can be wound to be parallel relative to each other, is characterized in that, ahead of the winding drum, at least one of the two outer wires passes a processing unit having a tool for smoothing off one wire edge.

The smoothing or flattening of the corresponding edge of the outer wire (edge wire) is performed directly prior to the winding operation. The same wire forming part of several wire layers placed above one another, the deforming of the outer edge should take place only in the region of the lowermost and/or uppermost turn. To this effect, the tool will be so controlled that the rounding of the wire edge is only performed with the lowermost and/or uppermost turn. Thus, the tool is set but only temporarily at the wire edge, for a time which corresponds to the length of the lowermost or uppermost turn. The length of the uppermost turn being greater than that of the lowermost turn, the tool has to act for a longer time on the wire during its application to the uppermost turn than during its application to the lowermost turn.

According to another aspect of the invention, the side faces of the wire cores, based on a plane extending at a right angle to the tire axis, are inclined at an angle $\alpha$ to the tire outside.

A better adaptation of the carcass to the contour of the (covered) wire core is possible as a result of the outward inclination at an angle $\alpha$ instead of a vertical extension of the lateral wire core surface facing the tire inside. The wire core side wall facing the tire inside is better accomodated to the natural extension of the carcass in this region thus enabling the carcass as it leaves the ellipsoid path to fllow substantially the contour of the inclined lateral face of the wire core.

As an additional advantage, the (annular) outer surface of the wire core projects farther to the tire outside than the internal surface of the wire core. By this means, the cavity formed during the production of the known tires between the sheathing of the wire core and the carcass end or the lateral tire casing is avoided or at least reduced considerably. In the pneumatic tire of the invention both lateral faces of the wire core are inclined relative to the tire outside so that the side of the wire core facing the tire inside is retracted with increasing diameter while the wire core side facing the outside of the tire projects outwardly. As a result thereof, a better adaptation to the form of the tire foot, to the extension of the carcass and to the deformations of the outer casing of the tire occurring during the operation is achieved.

Preferably, the angle α is within the range of from 14° to 20° and particularly within a range of between 15° and 18°.

For a better adaptation to the oblique rim, the inner surface of the wire core may have a diameter increasing to the outside. Such wire cores having an inclined interior surface have been known. Their cone angle generally is 15°. In the pneumatic vehicle tire of the invention, said angle adds up to the angle α so that the two great corner angles situated oppositely in diagonal direction of the parallelogram formed by the wire core cross section are within the range of from 50° to 80° and preferably within the range of from 60° to 80°.

The wire core of the invention to be used in a pneumatic vehicle tire is characterized in that the diameter of the interior surface increases from one side to the opposite side and that the side walls are inclined relative to the side of the greater diameter.

The invention also relates to an apparatus for the production of such a wire core. Said apparatus has a winding drum with a conical jacket on which a plurality of wires can be wound parallel relative to each other, and it is characterized in that at the smaller diameter and of the winding drum, a flange inclined towards the drum center is provided. Thus, several wires are wound in parallel relative to each other on the winding drum, each wire forming superposed turns, the outer wire wound against the inclined flange being adapted to the shape of the flange, and, with an increasing coil size, the other wires being urged to the side turned away from the flange.

Figure 2:
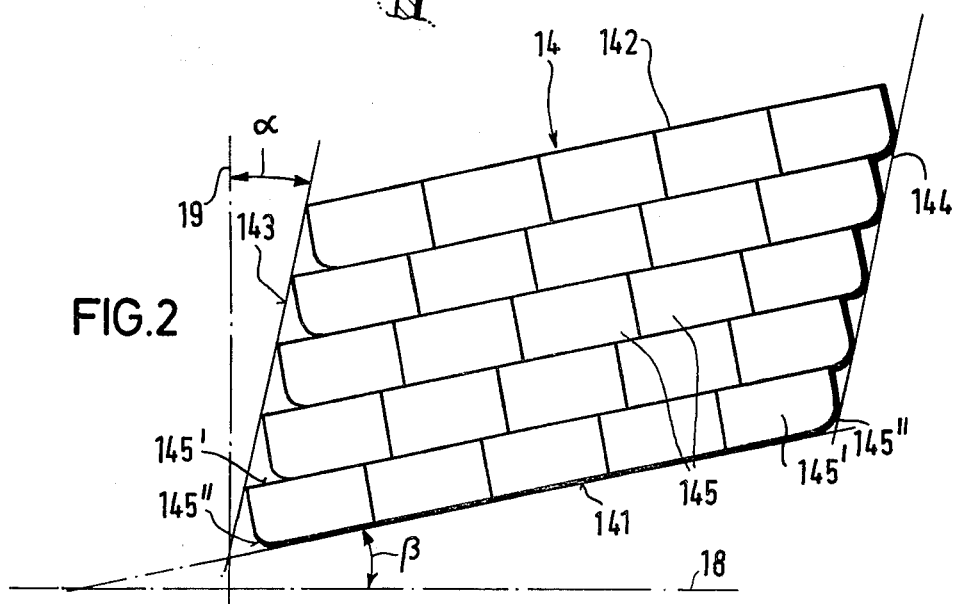

Embodiments of the invention are explained hereunder with reference to the drawings in which FIG. 1 is a cross section of a tire foot of a pneumatic tire of a vehicle, FIG. 2 is a cross section of the wire core of the pneumatic tire of the vehicle according to FIG. 1, FIG. 3 is a schematic view of the winding device for producing the wire core, FIG. 4 is a view of the tool to round off the outer edge of the edge wire and FIG. 5 is another embodiment of a wire core.

In FIG. 1, the pneumatic tire 10 of the vehicle is shown as mounted on an advanced rim 11. At the inside of the tire 10, there extends the carcass 12 which follows an ellipsoidal ideal curve 13, however, the outer end of the carcass 12 deviates without a break at a turning point 13' from the ideal curve 13 and is bent outwardly about the wire core 14.

The free end of the carass 12 is embedded into the outer cover 15 of the tire 10.

The nearly triangular space between the outer cover 15, the carcass 12 and the wire core 14 is filled with an apex mixture 16. The wire core 14 is enclosed by a protective strip 17 substantially accomodated to the contour of the wire core and surrounding the corners by rounding them off. The carcass 12 extends partially about said protective strip 17.

As evident from FIG. 1, the inside of the advanced rim 11 extends at an angle β to a parallel 18 to the tire axis. The same inclined position about the angle β is taken by the underside 141 and the upper side 142 of the wire core 14. The lateral face 143 facing the tire inside and the lateral face 144 of the wire core 14 facing the external side are inclined relative to a plane 19 at an angle α which is between 15° and 18°, the plane extending perpendicularly relative to the axis of the tire or to the line 18 resp. With increasing diameter, the lateral faces 143 and 144 approach the external side of the tire.

FIG. 2 shows the scaled-up cross section of the wire core 14. The wires 145 wound above one another to form several layers or turns are of a nearly parallelogram-shaped cross section, the width being 3 mm and the height being 1,5 mm. In the illustrated embodiment, each layer consists of five wires situated in parallel side by side, of which each consists of five superposed turns. The two edge wires 145' facing the rim are only provided with round portions 145" within the region of their lowermost turn along the edge forming one of the inner edges of the parallelogram-shaped wire core 14. In the embodiment according to FIG. 2 the edge wires or turns forming the upper edges of the wire core 14 are not oblique or rounded off. If necessary, said two upper edge wires also may display oblique or flat outer edges just like the edge wires 145'.

In FIG. 3, a schematic view of a device for the production of a wire core 14 is illustrated. Such device includes a winding drum 20 having a conical winding surface 21. The angle of inclination of the winding surface 21—based on the drum axis—is β. At the end at which the winding surface 21 has its smallest diameter, there is fitted at the winding drum 20 a flange 22 inclined at an angle α relative to the end face of the winding drum 20, i.e. it slightly protrudes beyond the one end of the winding surface 21. At the larger end side of the winding drum 20, a flange might not be necessary.

To form the wire core 14, several wires 145, 145' which form one winding layer is common are situated side by side when wound about the winding drum 20. Each wire has several turns laid one above the other accordingly. The wire illustrated quite on the left of FIG. 2 is wound against the flange 22 thus bringing about the desired inclination of the side 143 of the wire core. As obvious from FIG. 3, the wires 145 extend in a slightly inclined position to the drum 20 thus preventing the wire to be wound beneath the oblique flange 22 from being affected by the latter.

Directly ahead of the winding drum 20 each of the wires 145 is laterally prebent by a deforming unit 23 to impart to the originally rectangular wires the crossectional shape shown in FIG. 2 and to permit them to accomodate substantially free of tension to the inclined winding surface 21 and above the underlying wire layers resp.

Prior to getting via the deforming unit 23 to the winding drum 20 the edge wires 145' are passed through a corresponding processing station 24 in which the round portion 145" of the outer edge is produced over a longitudinal section corresponding to the length of the lowermost or uppermost turn. The processing station 24 according to FIG. 4 has two support rolls 25,26 being freely pivoted and supporting two surfaces of the edge wire 145' extending rectangularly to each other. The tool 26 used for forming the round portion 145" comprises a roll driven oppositely to the travel direction of the wire and set at an angle of 45° against the outer edge under formation of the edge wire 145, as well as a concave grinding- or milling surface 27 for the processing by chip removal of the wire edge. The tool 26 may be moved to and fro in direction of the double arrow 28, and in the advance position, the processing surface 27 is acting on the outer edge of the edge wire 145'.

A wire core produced with the use of two processing stations as illustrated in FIG. 4 is shown in FIG. 5. The cross section of all wire turns is square except for the innermost turn of the two lateral edge wires 145' whose outer edges directed to the tire axis are provided with round portions 145".

The wire core according to the cross sectional view of FIG. 5 consists of wires 145,145' wound in parallel side by side of which the two outermost wires 145' forming the lateral limitations of the wire core 14 have a round portion 145" over the total length of their outer edge. Said round portion 145" has for instance a radius of 1 mm in case of a wire with an edge length of 3 mm×1,5 mm. To improve the properties of the wire core, the round portion 145" is only used in the region of one sole winding layer or turn, however, for manufacturing reasons it is favorable to provide the total length of the lateral edge wires with one or two smoothed off edges thus doing away with any additional processing of the edge wires subject to the continuing winding operation.

What is claimed is:

1. A wire core for a vehicle pneumatic tire of the type having a tire bead mountable in a rim, said wire core being situated within said bead and being at least partially enclosed by a carcass, said wire core having a generally parallelogram shaped cross-section and comprising:
    a plurality of wire layers overlaying one another with intimate contact therebetween,
    the cross-section of the wires in each of said layers being generally rectangular with unrounded edges, except that:
    the wires forming the most inner and/or most outer side of said core have one or two of their edges substantially rounded, said rounding being sufficient to reduce stress concentrations imparted by a corner of said core on the enclosing carcass, the other edges of said innermost and/or outermost wires not being rounded.

2. A wire core according to claim 1 wherein only the innermost and/or outermost wire in the bottom layer of said core has said one or two substantially rounded edges.

3. A wire core according to claim 1 wherein the side faces of said wire core are inclined at an angle relative to a plane extending at a right angle to the tire axis, said angle being within the range of from 14° to 20°.

4. A vehicle pneumatic tire containing a wire core as defined in claim 1.

* * * * *